(12) United States Patent
Nam et al.

(10) Patent No.: US 11,917,541 B2
(45) Date of Patent: Feb. 27, 2024

(54) CONFIGURABLE WAKEUP SIGNAL MONITORING FOR SHORT AND LONG DISCONTINUOUS RECEPTION CYCLE OPERATION

(71) Applicant: QUALCOMM Incorporated, San Diego, CA (US)

(72) Inventors: Wooseok Nam, San Diego, CA (US); Olufunmilola Omolade Awoniyi-Oteri, San Diego, CA (US); Tao Luo, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 16/948,020

(22) Filed: Aug. 27, 2020

(65) Prior Publication Data
US 2021/0068053 A1   Mar. 4, 2021

Related U.S. Application Data

(60) Provisional application No. 62/894,436, filed on Aug. 30, 2019.

(51) Int. Cl.
*H04W 52/02* (2009.01)
*H04L 5/00* (2006.01)
(Continued)

(52) U.S. Cl.
CPC ....... *H04W 52/0229* (2013.01); *H04L 5/0092* (2013.01); *H04W 72/0446* (2013.01);
(Continued)

(58) Field of Classification Search
CPC ............. H04W 52/0229; H04W 76/28; H04W 72/042; H04W 72/0446; H04W 72/0453; H04W 80/02; H04L 5/0092
(Continued)

(56) References Cited

U.S. PATENT DOCUMENTS

| 10,834,777 | B2 * | 11/2020 | Babaei | H04W 76/28 |
| 2020/0351777 | A1 * | 11/2020 | Kim | H04L 5/0053 |
| 2021/0259044 | A1 * | 8/2021 | Islam | H04W 52/0229 |

FOREIGN PATENT DOCUMENTS

| CN | 112586041 A * | 3/2021 | ........ H04W 52/0219 |
| EP | 4007380 A1 * | 6/2022 | ........... H04B 7/0413 |
| KR | 10-2019-0051866 | * 11/2020 | ............ H04W 72/12 |

OTHER PUBLICATIONS

R1-1906980 (Year: 2019).*

(Continued)

*Primary Examiner* — Intekhaab A Siddiquee
(74) *Attorney, Agent, or Firm* — Harrity & Harrity, LLP

(57) ABSTRACT

Various aspects of the present disclosure generally relate to wireless communication. In some aspects, a user equipment (UE) may receive a wakeup signal (WUS) monitoring configuration that identifies one or more first WUS monitoring parameters associated with short discontinuous reception (DRX) cycle operation of the UE and one or more second WUS monitoring parameters associated with long DRX cycle operation of the UE. The UE may monitor for a WUS based at least in part on the WUS monitoring configuration. Numerous other aspects are provided.

37 Claims, 9 Drawing Sheets

(51) Int. Cl.
    *H04W 72/0446*     (2023.01)
    *H04W 72/0453*     (2023.01)
    *H04W 72/23*     (2023.01)
    *H04W 76/28*     (2018.01)
    *H04W 80/02*     (2009.01)

(52) U.S. Cl.
    CPC ....... *H04W 72/0453* (2013.01); *H04W 72/23* (2023.01); *H04W 76/28* (2018.02); *H04W 80/02* (2013.01)

(58) Field of Classification Search
    USPC ......................................................... 370/318
    See application file for complete search history.

(56) References Cited

OTHER PUBLICATIONS

R1-1908605 (Year: 2019).*
R1-1906856, "PDCCH-based power saving signal/channel", source Vivo, 3GPP TSG RAN WG1 #97 (Year: 2019).*
62732466P (Year: 2018).*
"3rd Generation Partnership Project; Technical Specification Group Radio Access Network; NR; Study on User Equipment (UE) Power Saving in NR (Release 16)", 3GPP Standard; Technical Report, 3GPP TR38.840, 3rd Generation Partnership Project(3GPP), Mobile Competence Centre, 650, Route Des Lucioles, F-06921, Sophia-Antipolis Cedex, France, No. V16.0.0, Jun. 24, 2019 (Jun. 24, 2019), pp. 1-74, XP051754330, [retrieved on Jun. 24, 2019] Paragraph 5 .1. 4.
CATT: "Power Saving Signal/Channel Design and Performance", 3GPP Draft, 3GPP TSG RAN WG1 Meeting #98, R1-1908605, 3rd Generation Partnership Project (3GPP), Mobile Competence Centre , 650, Route Des Lucioles, F-06921 Sophia-Antipolis Cedex, France , vol. RAN WG1, No. Prague, CZ, Aug. 26, 2019-Aug. 30, 2019, Aug. 17, 2019 (Aug. 17, 2019), XP051765213, 19 Pages.
International Search Report and Written Opinion—PCT/US2020/070478—ISA/EPO—dated Nov. 30, 2020.
Qualcomm Incorporated: "PDCCH-Based Power Saving Channel Design", 3GPP Draft, R1-1912970, 3GPP TSG-RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno. USA, Nov. 18, 2019-Nov. 22, 2019, Nov. 9, 2019 (Nov. 9, 2019), XP051823732, pp. 1-19.
Samsung: "PDCCH-Based Power Saving Signal/Channel", 3GPP Draft, R1-1906980, 3GPP TSG RAN WG1 #97, On PDCCH-Based Power Saving Signal, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728429, 12 Pages.

* cited by examiner

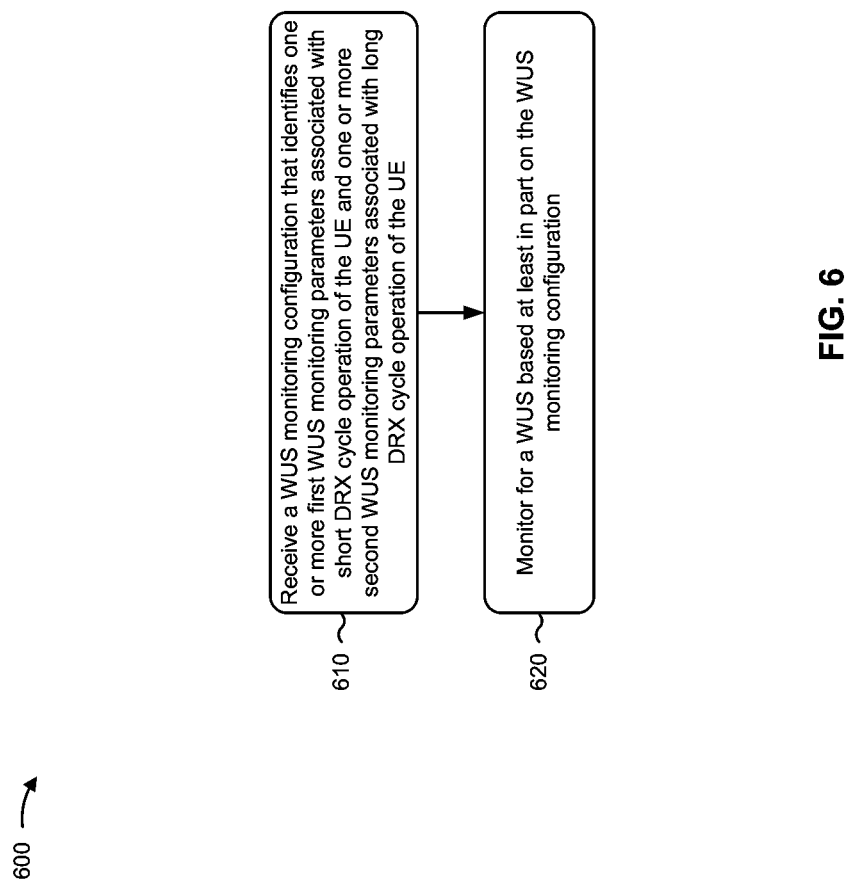

CONFIGURABLE WAKEUP SIGNAL MONITORING FOR SHORT AND LONG DISCONTINUOUS RECEPTION CYCLE OPERATION

CROSS-REFERENCE TO RELATED APPLICATION

This patent application claims priority to U.S. Provisional Patent Application No. 62/894,436, filed on Aug. 30, 2019, entitled "CONFIGURABLE WAKEUP SIGNAL MONITORING FOR SHORT AND LONG DISCONTINUOUS RECEPTION CYCLE OPERATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configurable wakeup signal monitoring for short and long discontinuous reception cycle operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a wakeup signal (WUS) monitoring configuration that identifies one or more first WUS monitoring parameters associated with short discontinuous reception (DRX) cycle operation of the UE, and one or more second WUS monitoring parameters associated with long DRX cycle operation of the UE; and monitoring for a WUS based at least in part on the WUS monitoring configuration.

In some aspects, a method of wireless communication, performed by a base station (BS), may include transmitting, to a UE, a WUS monitoring configuration that identifies one or more first WUS monitoring parameters associated with short DRX cycle operation of the UE, and one or more second WUS monitoring parameters associated with long DRX cycle operation of the UE; and transmitting, to the UE, a WUS based at least in part on the WUS monitoring configuration.

In some aspects, a UE for wireless communication may include memory and one or more processors operatively coupled to the memory. The memory and the one or more processors may be configured to receive a WUS monitoring configuration that identifies one or more first WUS monitoring parameters associated with short DRX cycle operation of the UE, and one or more second WUS monitoring parameters associated with long DRX cycle operation of the UE; and monitor for a WUS based at least in part on the WUS monitoring configuration.

In some aspects, a B S for wireless communication may include memory and one or more processors operatively coupled to the memory. The memory and the one or more processors may be configured to transmit, to a UE, a WUS monitoring configuration that identifies one or more first WUS monitoring parameters associated with short DRX cycle operation of the UE, and one or more second WUS monitoring parameters associated with long DRX cycle operation of the UE; and transmit, to the UE, a WUS based at least in part on the WUS monitoring configuration.

In some aspects, a non-transitory computer-readable medium may store one or more instructions for wireless communication. The one or more instructions, when executed by one or more processors of a UE, may cause the one or more processors to: receive a WUS monitoring configuration that identifies one or more first WUS monitoring parameters associated with short DRX cycle operation of the UE, and one or more second WUS monitoring parameters associated with long DRX cycle operation of the UE; and monitor for a WUS based at least in part on the WUS monitoring configuration.

In some aspects, a non-transitory computer-readable medium may store one or more instructions for wireless communication. The one or more instructions, when executed by one or more processors of a BS, may cause the one or more processors to: transmit, to a UE, a WUS monitoring configuration that identifies one or more first WUS monitoring parameters associated with short DRX cycle operation of the UE, and one or more second WUS monitoring parameters associated with long DRX cycle operation of the UE; and transmit, to the UE, a WUS based at least in part on the WUS monitoring configuration.

In some aspects, an apparatus for wireless communication may include means for receiving a WUS monitoring configuration that identifies one or more first WUS monitoring parameters associated with short DRX cycle operation of the apparatus, and one or more second WUS monitoring parameters associated with long DRX cycle operation of the apparatus; and means for monitoring for a WUS based at least in part on the WUS monitoring configuration.

In some aspects, an apparatus for wireless communication may include means for transmitting, to a UE, a WUS monitoring configuration that identifies one or more first WUS monitoring parameters associated with short DRX cycle operation of the UE, and one or more second WUS monitoring parameters associated with long DRX cycle operation of the UE; and means for transmitting, to the UE, a WUS based at least in part on the WUS monitoring configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
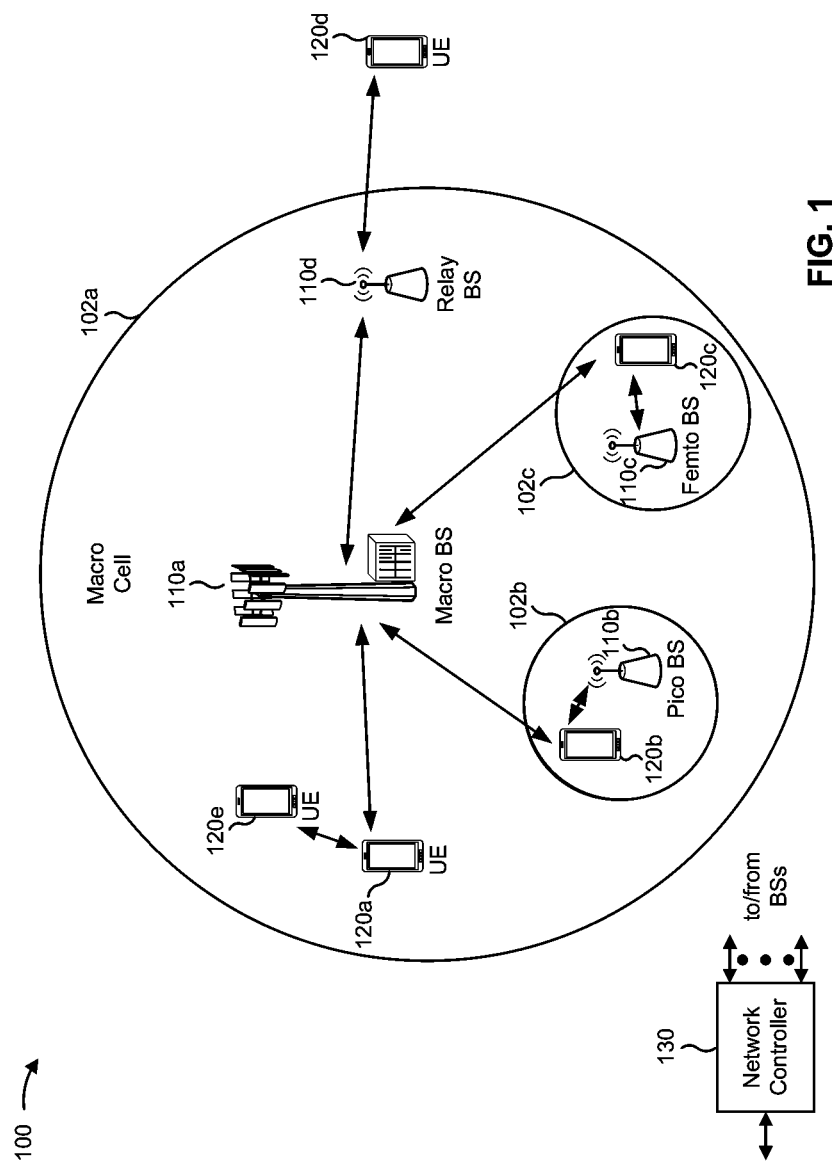
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
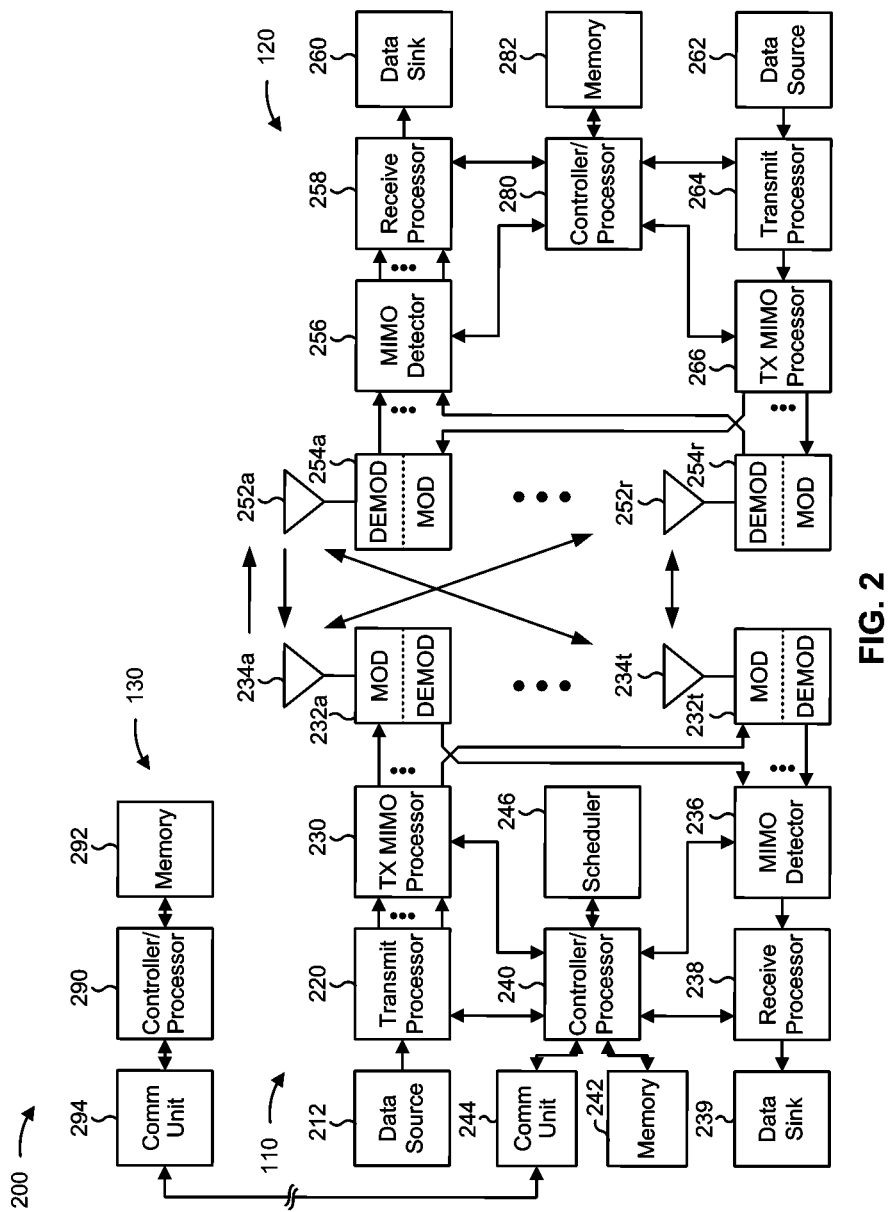
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configurable wakeup signal (WUS) monitoring for short and long discontinuous reception (DRX) cycle operation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving a WUS monitoring configuration that identifies one or more first WUS monitoring parameters associated with short DRX cycle operation of the UE and one or more second WUS monitoring parameters associated with long DRX cycle operation of the UE, means for monitoring for a WUS based at least in part on the WUS monitoring configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE 120, a WUS monitoring configuration that identifies one or more first WUS monitoring parameters associated with short DRX cycle operation of the UE 120 and one or more second WUS monitoring parameters associated with long DRX cycle operation of the UE 120, means for transmitting, to the UE 120, a WUS based at least in part on the WUS monitoring configuration and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
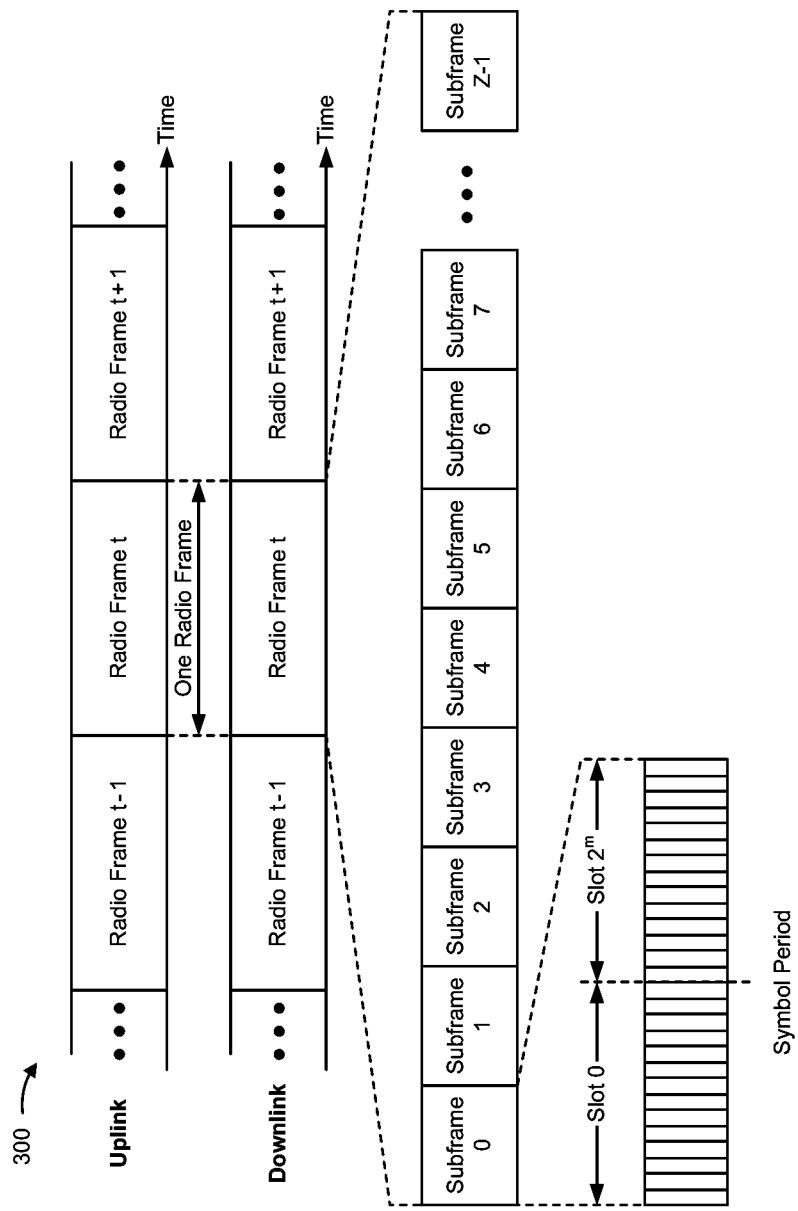
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$)

subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
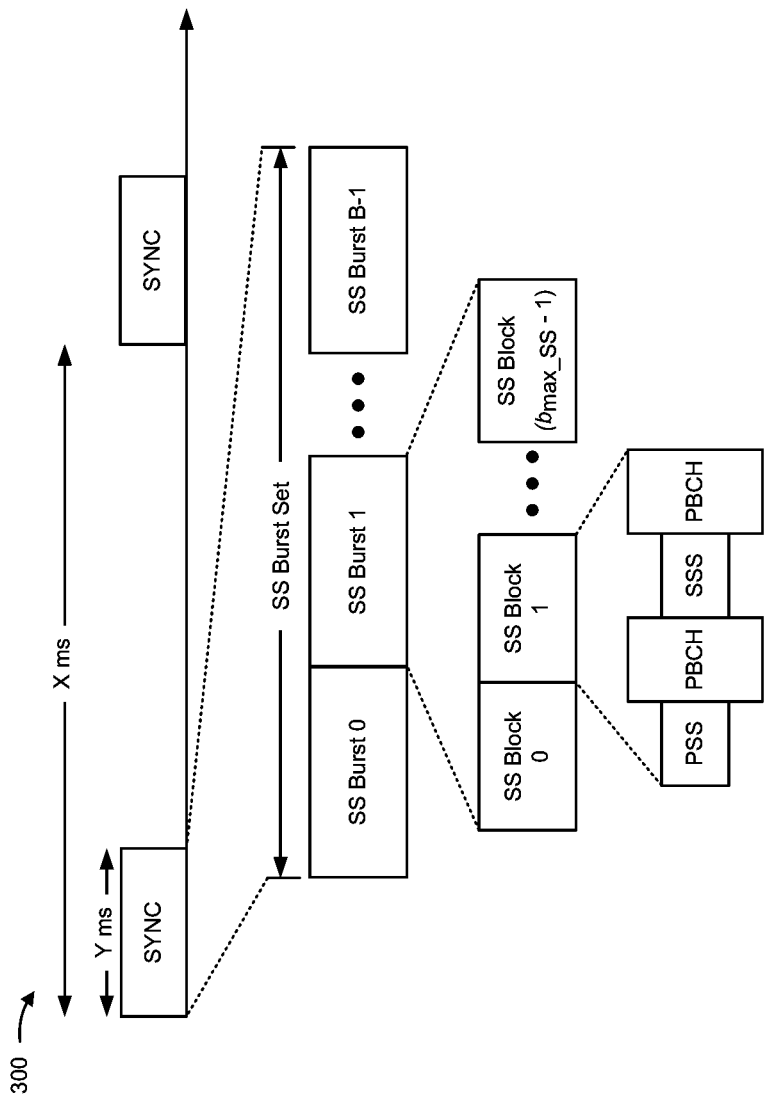
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
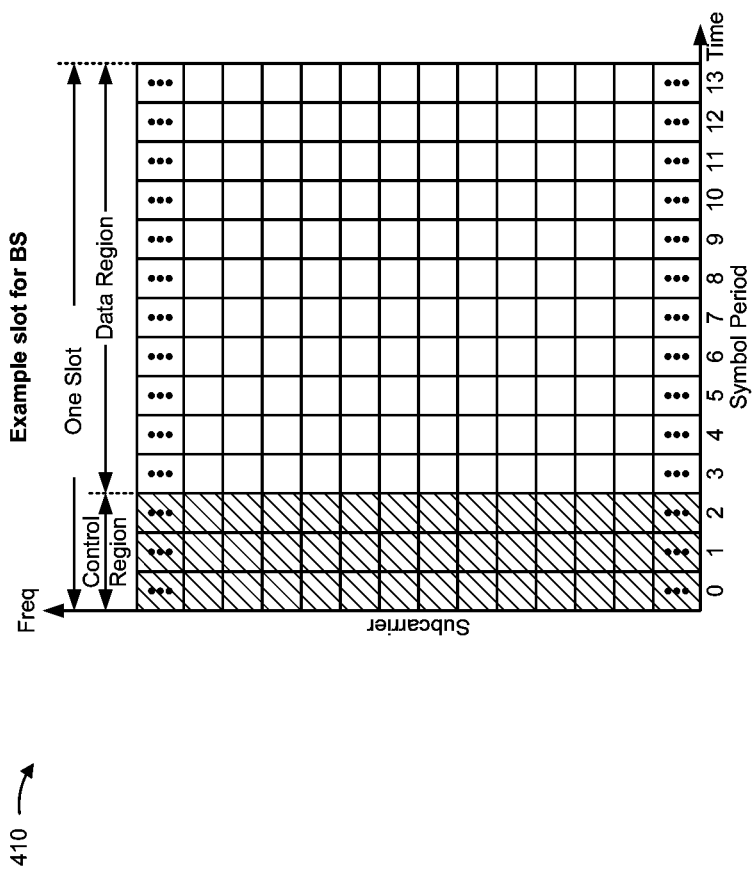
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In some cases, a UE may start DRX operation to conserve battery life of the UE. In some cases, a BS may transmit an instruction to the UE to start DRX operation, to transition to a DRX sleep mode, and/or the like. In some cases, the UE may initiate sidelink DRX operation based at least in part on expiration of a DRX inactivity timer.

DRX operation may include transitioning to a DRX sleep mode for a DRX sleep duration. In the DRX sleep mode, the UE may refrain from transmitting or receiving communications on an access link or sidelink, may deactivate particular subcarriers or component carriers (e.g., if carrier aggregation is implemented on the access link) of the access link and/or sidelink, may deactivate one or more components of the UE, and/or the like. Moreover, DRX operation may include periodically transitioning out of the DRX sleep mode and into a DRX on mode (or activate mode) for a DRX on duration to monitor for downlink communications from a BS, sidelink communications from another UE, and/or the like.

The UE may perform DRX operation based at least in part on a DRX cycle. A DRX cycle may include a combination of a DRX on mode and a DRX sleep mode. For example, a DRX cycle may include a DRX sleep duration followed by a DRX on duration. As another example, a DRX cycle may include a DRX on duration followed by a DRX sleep duration. In some cases, the DRX operation of the UE may include various types of DRX cycles, such as a short DRX cycle, a long DRX cycle, and/or the like. The DRX cycle duration of the short DRX cycle may be shorter relative to the DRX cycle duration of the long DRX cycle. As an example, a short DRX cycle duration may be 5 subframes and a long DRX cycle duration may be 10 subframes. In some cases, the UE may transition from short DRX cycle operation to long DRX cycle operation based at least in part on not transmitting and/or receiving communications in a particular quantity of consecutive DRX on mode durations.

In some cases, the UE may transition to the DRX on mode based at least in part on receiving a WUS from a BS, which may indicate that the UE is to transition to the DRX on mode and/or may include other types of information (e.g., channel state information reference signal (CSI-RS) triggering, an indication to reduce physical downlink control channel (PDCCH) monitoring, bandwidth part (BWP) switching, secondary cell (SCell) group wake-up, and/or the like). In some cases, the UE may monitor a time-domain resource and/or frequency-domain resource (which may be referred to as a WUS occasion) in which a BS may transmit a downlink control information (DCI) communication that includes the WUS. Thus, if the UE does not receive a WUS when monitoring a WUS occasion, the UE refrains from transitioning to a DRX on mode in the next DRX on duration. Accordingly, the BS may use the WUS to increase the efficiency and power-saving of DRX operation by reducing the quantity of times that the UE transitions to the DRX on mode.

In some cases, the BS may configure the UE to periodically monitor WUS occasions for a WUS. The BS may configure a WUS occasion to occur at an offset duration prior to a DRX on duration. The offset duration may be configured such that there is sufficient time between receiving the WUS and the DRX on duration for the UE to transition from a DRX sleep mode to the DRX on mode. However, if the UE transitions between short DRX cycle operation and long DRX cycle operation and/or between long DRX cycle operation and short DRX cycle operation, the periodic WUS occasions may no longer align with the corresponding DRX on durations. As a result, the UE may monitor for a WUS when the BS is not to transmit a WUS, may not be monitoring for a WUS when the BS is to transmit the WUS, and/or the like. This may cause the UE to miss reception the WUS, remain in the DRX sleep mode, and miss reception of corresponding communications that were to be received by the UE in a DRX on mode.

Some aspects described herein provide techniques and apparatuses for configurable WUS monitoring for short and long DRX cycle operation. In some aspects, a BS may transmit a WUS monitoring configuration to a UE. The WUS monitoring configuration may identify one or more first WUS monitoring parameters associated with short DRX cycle operation of the UE and one or more second WUS monitoring parameters associated with long DRX cycle operation of the UE. The UE may monitor for a WUS during short DRX cycle operation based at least in part on the one or more first WUS monitoring parameters, and may monitor for a WUS during long DRX cycle operation based at least in part on the one or more second WUS monitoring parameters. In this way, the WUS monitoring configuration may configure WUS occasions for the UE such that WUS occasions occur at a particular offset duration prior to an associated DRX on duration, regardless of whether the UE is in short DRX cycle operation or long DRX cycle operation.

Figure 5A:
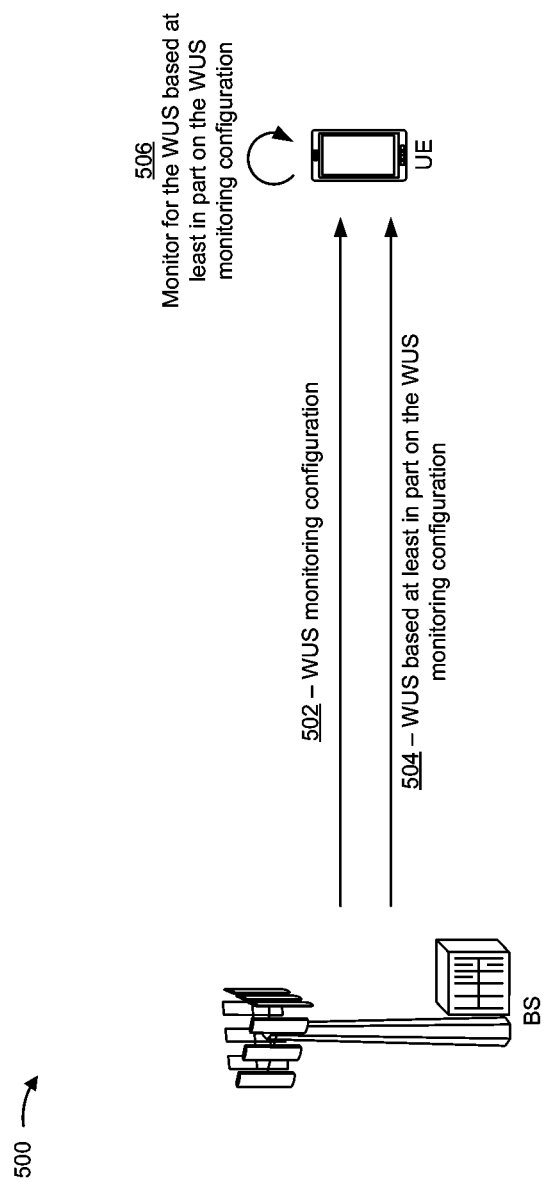
FIGS. 5A and 5B are diagrams illustrating one or more examples of configurable wakeup signal monitoring for short and long discontinuous reception, in accordance with various aspects of the present disclosure cycle operation.
Figure 5B:
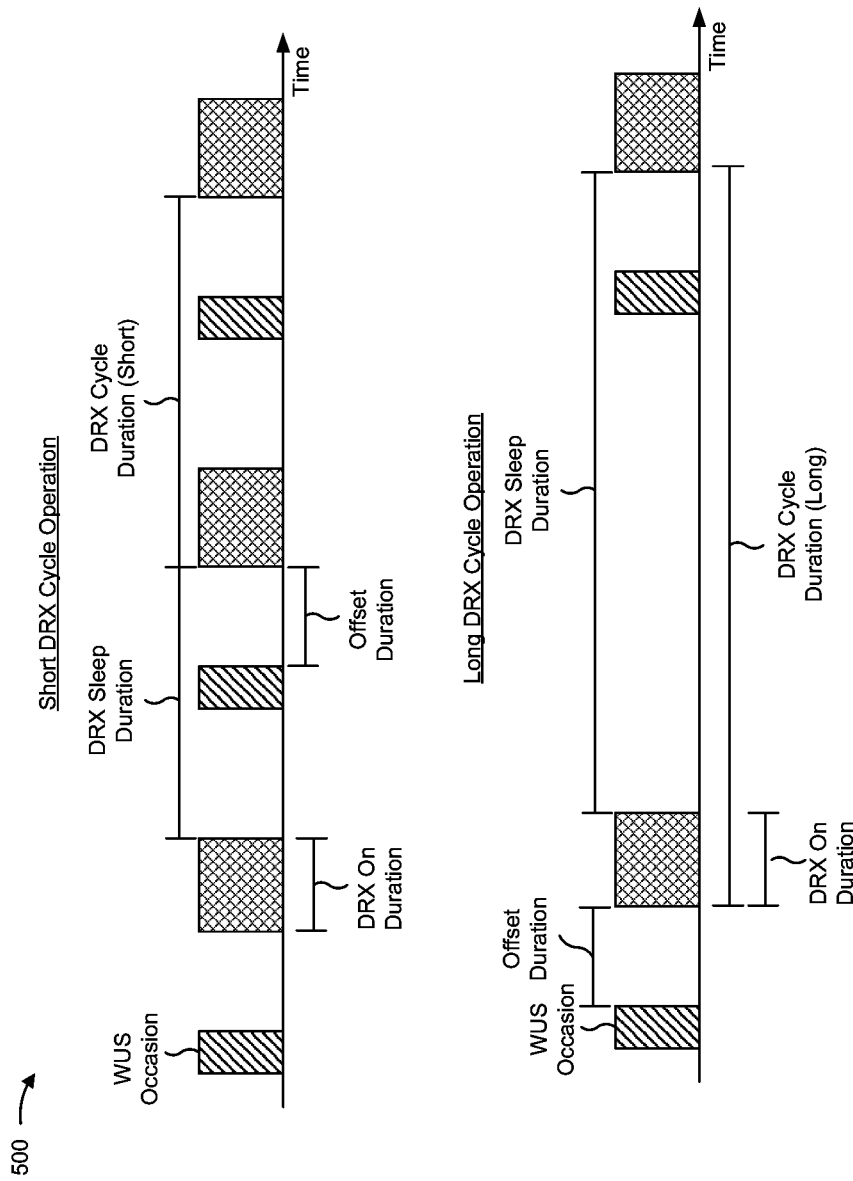

FIGS. 5A and 5B is a diagram illustrating one or more examples 500 of configurable WUS monitoring for short and long DRX cycle operation, in accordance with various aspects of the present disclosure. As shown in FIGS. 5A and 5B, example(s) 500 may include communication between a BS (e.g., BS 110) and a UE (e.g., UE 120).

In some aspects, the BS may configure the UE to perform DRX operation, such as connected mode DRX operation (e.g., DRX operation while the UE is in a connected mode with the BS), idle mode DRX operation (e.g., DRX operation while the UE is in an idle mode), and/or the like. The DRX operation of the UE may include short DRX cycle operation and long DRX cycle operation. Moreover, the UE may be configured to transition between short DRX cycle operation and long DRX cycle operation.

As shown in FIG. 5A, and by reference number 502, the BS may transmit, to the UE, a WUS monitoring configuration to configure the UE for WUS monitoring for short DRX cycle operation and long DRX cycle operation. In some aspects, the WUS monitoring configuration may be transmitted to the UE during a random access channel (RACH) procedure between the UE and the BS, prior to the UE and the BS establishing a connection, after the UE and the BS establish a connection, and/or the like. In some aspects, the WUS configuration may be included in a radio resource control (RRC) communication, a medium access control (MAC) control element (MAC-CE) communication, a downlink control information (DCI) communication, system information (e.g., a system information block (SIB), other system information (OSI), remaining minimum system information (RMSI), a synchronization signal block (SSB), and/or the like), and/or the like.

In some aspects, the WUS monitoring configuration may include one or more first WUS monitoring parameters for monitoring for a WUS during short DRX cycle operation of the UE and may include one or more second WUS monitoring parameters for monitoring for a WUS during long DRX cycle operation of the UE. In some aspects, the one or more first WUS monitoring parameters may identify a WUS occasion duration for WUS occasions during short DRX cycle operation of the UE.

In some aspects, the one or more first WUS monitoring parameters may identify a periodicity of WUS occasions during short DRX operation of the UE. In some aspects, the periodicity of WUS occasions may correspond to the periodicity of DRX on durations while the UE is in short DRX cycle operation, such that each WUS occasion is associated with a DRX on duration for short DRX operation of the UE. In some aspects, the one or more first WUS monitoring parameters may identify an offset duration between each WUS occasion and an associated DRX on duration for short DRX cycle operation of the UE.

In some aspects, the one or more first WUS monitoring parameters may identify one or more time-domain and/or frequency-domain resources for the WUS occasions during short DRX cycle operation of the UE. The one or more time-domain and/or frequency-domain resources may be indicated in a WUS BWP configured for short DRX cycle operation of the UE, a WUS control resource set (CORE-SET) configured for short DRX cycle operation of the UE, a WUS search space (SS) or WUS SS set configured for short DRX cycle operation of the UE, and/or the like.

In some aspects, the one or more first WUS monitoring parameters may identify a physical downlink channel in which a WUS is to be transmitted to the UE for short DRX cycle operation of the UE. The physical downlink channel may include a PDCCH, a PDSCH, and/or the like. In some aspects, the one or more first WUS monitoring parameters may identify a WUS type for the WUS during short DRX cycle operation of the UE. The WUS type may be a UE-specific WUS (e.g., a WUS configured specifically for the UE), a group-specific WUS (e.g., a WUS configured for a particular group of UEs), and/or the like.

In some aspects, the one or more first WUS monitoring parameters may identify a DCI configuration for the WUS during short DRX cycle operation of the UE. The DCI configuration may indicate a static mapping or a dynamic mapping for the WUS during short DRX cycle operation of the UE. If the WUS is configured with a static mapping, WUS indicator fields for the UE and other UEs may be interleaved with wakeup information fields for the UE and other UEs. For example, the WUS may include a WUS indicator field for the UE and an adjacent wakeup information field for the UE, may include a WUS indicator field for another UE adjacent to the wakeup information field for the UE and an adjacent wakeup information field for the other UE, and so on. If the WUS is configured with a dynamic mapping, WUS indicator fields for the UE and other UEs may be grouped together, and wakeup information fields for the UE and other UEs may be grouped separately from the WUS indicator fields.

In some aspects, the one or more first WUS monitoring parameters may identify whether the UE is to monitor for the WUS during short DRX cycle operation of the UE. For example, the one or more first WUS monitoring parameters may explicitly indicate whether the UE is to monitor for the WUS during short DRX cycle operation of the UE. As another example, the one or more first WUS monitoring parameters may implicitly indicate whether the UE is to monitor for the WUS during short DRX cycle operation of the UE. For example, the one or more first WUS monitoring parameters may include a duration threshold, and the UE may determine whether to monitor for the WUS during short DRX cycle operation of the UE based at least in part on whether the DRX cycle duration of the short DRX cycle of the UE satisfies the duration threshold.

In some aspects, the one or more second WUS monitoring parameters may identify a WUS occasion duration for WUS occasions during long DRX cycle operation of the UE. In some aspects, the one or more second WUS monitoring parameters may identify a periodicity of WUS occasions during long DRX operation of the UE. In some aspects, the periodicity of WUS occasions may correspond to the periodicity of DRX on durations while the UE is in long DRX cycle operation such that each WUS occasion is associated with a DRX on duration for long DRX operation of the UE. In some aspects, the one or more second WUS monitoring parameters may identify an offset duration between each WUS occasion and an associated DRX on duration for long DRX cycle operation of the UE.

In some aspects, the one or more second WUS monitoring parameters may identify one or more time-domain and/or frequency-domain resources for the WUS occasions during long DRX cycle operation of the UE. The one or more time-domain and/or frequency-domain resources may be indicated in a WUS BWP configured for long DRX cycle operation of the UE, a WUS CORESET configured for long DRX cycle operation of the UE, a WUS SS or WUS SS set configured for short DRX cycle operation of the UE, and/or the like.

In some aspects, the one or more second WUS monitoring parameters may identify a physical downlink channel in which a WUS is to be transmitted to the UE for long DRX cycle operation of the UE. The physical downlink channel may include a PDCCH, a PDSCH, and/or the like. In some aspects, the one or more second WUS monitoring parameters may identify a WUS type for the WUS during long DRX cycle operation of the UE. The WUS type may be a UE-specific WUS, a group-specific WUS, and/or the like.

In some aspects, the one or more second WUS monitoring parameters may identify a DCI configuration for the WUS during long DRX cycle operation of the UE. The DCI configuration may indicate a static mapping or a dynamic mapping for the WUS during long DRX cycle operation of the UE. If the WUS is configured with a static mapping, WUS indicator fields for the UE and other UEs may be interleaved with wakeup information fields for the UE and other UEs. For example, the WUS may include a WUS indicator field for the UE and an adjacent wakeup information field for the UE, may include a WUS indicator field for another UE adjacent to the wakeup information field for the UE and an adjacent wakeup information field for the other UE, and so on. If the WUS is configured with a dynamic mapping, WUS indicator fields for the UE and other UEs may be grouped together, and wakeup information fields for the UE and other UEs may be grouped separately from the WUS indicator fields.

In some aspects, the one or more second WUS monitoring parameters may identify whether the UE is to monitor for the WUS during long DRX cycle operation of the UE. For example, the one or more long WUS monitoring parameters may explicitly indicate whether the UE is to monitor for the WUS during long DRX cycle operation of the UE. As another example, the one or more long WUS monitoring parameters may implicitly indicate whether the UE is to monitor for the WUS during long DRX cycle operation of the UE. For example, the one or more second WUS monitoring parameters may include a duration threshold, and the UE may determine whether to monitor for the WUS during long DRX cycle operation of the UE based at least in part on whether the DRX cycle duration of the long DRX cycle of the UE satisfies the duration threshold.

In some aspects, the BS may configure the WUS monitoring configuration such that at least a subset of the one or more first WUS monitoring parameters and at least a subset of the one or more second WUS monitoring parameters are different WUS monitoring parameters. For example, the BS may configure the WUS monitoring configuration such that different offset durations are configured for short DRX cycle operation and long DRX cycle operation of the UE. As another example, the BS may configure the WUS monitoring configuration such that different WUS BWPs, WUS SS sets, and/or WUS CORESETSs are configured for short DRX cycle operation and long DRX cycle operation of the UE (e.g., such that greater time-domain resources and/or frequency-domain resources are configured for short DRX cycle operation relative to long DRX cycle operation, or such that fewer time-domain resources and/or frequency-domain resources are configured for short DRX cycle operation relative to long DRX cycle operation).

As another example, the BS may configure the WUS monitoring configuration such that different DCI configurations are configured for short DRX cycle operation and long DRX cycle operation of the UE (e.g., such that a static mapping is configured for a WUS for short DRX cycle operation and a dynamic mapping is configured for a WUS for long DRX cycle operation, or a dynamic mapping is configured for a WUS for short DRX cycle operation and a static mapping is configured for a WUS for long DRX cycle operation). As another example, the BS may configure the WUS monitoring configuration such that different WUS types are configured for short DRX cycle operation and long DRX cycle operation of the UE (e.g., such that a UE-specific WUS is configured for a WUS for short DRX cycle operation and a group-specific WUS is configured for a WUS for long DRX cycle operation, or a group-specific WUS is configured for a WUS for short DRX cycle operation and a UE-specific WUS is configured for a WUS for long DRX cycle operation).

In some aspects, the BS may configure the WUS monitoring configuration to include an overlap or collision parameter. The UE may resolve a collision between a long DRX cycle and a short DRX cycle that at least partially overlap or collide in the time domain. The overlap or collision parameter may indicate that the UE is to operate in the DRX cycle having a higher priority relative to the other DRX cycle. In these examples, if the UE determines that the long DRX cycle at least partially overlaps or collides with the short DRX cycle, the UE may operate in the long DRX cycle based at least in part on the long DRX cycle having a higher priority relative to the short DRX cycle. Conversely, if the UE determines that the long DRX cycle at least partially overlaps or collides with the short DRX cycle, the UE may operate in the short DRX cycle based at least in part on the short DRX cycle having a higher priority relative to the long DRX cycle.

As further shown in FIG. 5A, and by reference number 504, the BS may transmit a WUS to the UE based at least in part on the WUS monitoring configuration. For example, the BS may transmit a WUS to the UE based at least in part on the one or more first WUS monitoring parameters when the UE is in short DRX cycle operation. As another example, the BS may transmit a WUS to the UE based at least in part on the one or more second WUS monitoring parameters when the UE is in long DRX cycle operation.

As further shown in FIG. 5A, and by reference number 506, the UE may monitor for the WUS based at least in part on the WUS monitoring configuration. For example, if the UE is in short DRX cycle operation, the UE may monitor for the UE based at least in part on the one or more first WUS monitoring parameters. In this case, the UE may monitor for a WUS during a WUS occasion (e.g., may start monitoring for the WUS at the beginning of a WUS occasion) and at a periodicity of WUS occasions indicated by the one or more first WUS monitoring parameters, may identify a WUS indicator and wakeup information in the WUS based at least in part on the one or more first WUS monitoring parameters, may monitor for the WUS in one or more time-domain and/or frequency-domain resources based at least in part on the one or more first WUS monitoring parameters, and/or the like.

As another example, if the UE is in long DRX cycle operation, the UE may monitor for the UE based at least in part on the one or more second WUS monitoring parameters. In this case, the UE may monitor for a WUS during a WUS occasion and at a periodicity of WUS occasions indicated by the one or more second WUS monitoring parameters, may identify a WUS indicator and wakeup information in the WUS based at least in part on the one or more second WUS monitoring parameters, may monitor for the WUS in one or more time-domain and/or frequency-domain resources based at least in part on the one or more second WUS monitoring parameters, and/or the like.

FIG. 5B illustrates examples of a WUS configuration for short DRX cycle operation and a WUS configuration for long DRX cycle operation. In some aspects, the UE may be configured with other WUS configurations, other short DRX cycle operation configurations, other long DRX cycle operation configurations, and/or the like.

As shown in FIG. 5B, the periodicity of WUS occasions for short DRX cycle operation may be shorter than the periodicity of WUS occasions for long DRX cycle operation, such that short DRX cycle operation includes a greater quantity of WUS occasions relative to long DRX cycle operation to accommodate for the greater quantity of DRX on durations of short DRX cycle operation. In some aspects, other WUS monitoring parameters of short DRX cycle operation and long DRX cycle operation may be different, such as the WUS occasion duration of WUS occasions, the offset duration between WUS occasions and DRX on durations, time-domain resources and/or frequency-domain resources allocated to the WUS occasions, and/or other WUS monitoring parameters.

While the DRX cycles illustrated in FIG. 5B show a DRX on duration followed by a DRX sleep duration, the DRX cycles may alternatively include a DRX sleep duration followed by a DRX on duration.

In this way, the BS may transmit a WUS monitoring configuration to the UE. The WUS monitoring configuration may identify one or more first WUS monitoring parameters associated with short DRX cycle operation of the UE and one or more second WUS monitoring parameters associated with long DRX cycle operation of the UE. The UE may monitor for a WUS during short DRX cycle operation based at least in part on the one or more first WUS monitoring parameters, and may monitor for a WUS during long DRX cycle operation based at least in part on the one or more second WUS monitoring parameters. In this way, the WUS monitoring configuration may configure WUS occasions for the UE such that WUS occasions occur at a particular offset duration prior to an associated DRX on duration, regardless of whether the UE is in short DRX cycle operation or long DRX cycle operation.

As indicated above, FIGS. 5A and 5B are provided as one or more examples. Other examples may differ from what is described with respect to FIGS. 5A and 5B.

FIG. 6 is a diagram illustrating an example process 600 performed, for example, by a UE, in accordance with various aspects of the present disclosure. Example process 600 is an example where the UE (e.g., UE 120) performs operations associated with configurable WUS monitoring for short and long DRX cycle operation.

As shown in FIG. 6, in some aspects, process 600 may include receiving a WUS monitoring configuration that identifies one or more first WUS monitoring parameters associated with short DRX cycle operation of the UE and one or more second WUS monitoring parameters associated with long DRX cycle operation of the UE (block 610). For example, the UE (e.g., using receive processor 258, transmit processor 264, controller/processor 280, memory 282, and/or the like) may receive a WUS monitoring configuration that identifies one or more first WUS monitoring parameters associated with short DRX cycle operation of the UE and one or more second WUS monitoring parameters associated with long DRX cycle operation of the UE, as described above. In some aspects, if the UE receives the WUS monitoring configuration, the UE may identify whether the UE is in short DRX cycle operation or long DRX cycle operation.

As further shown in FIG. 6, in some aspects, process 600 may include monitoring for a WUS based at least in part on the WUS monitoring configuration (block 620). For example, the UE (e.g., using receive processor 258, transmit processor 264, controller/processor 280, memory 282, and/or the like) may monitor for a WUS based at least in part on the WUS monitoring configuration, as described above. In some aspects, the UE may monitor for the WUS based at least in part on the one or more first WUS monitoring parameters identified in the WUS monitoring configuration based at least in part on determining that the UE is in short DRX cycle operation. In some aspects, the UE may monitor for the WUS based at least in part on the one or more second WUS monitoring parameters identified in the WUS monitoring configuration based at least in part on determining that the UE is in long DRX cycle operation.

Process 600 may include additional aspects, such as any single aspect or any combination of aspects described below and/or in connection with one or more other processes described elsewhere herein.

In a first aspect, at least a subset of the one or more first WUS monitoring parameters and at least a subset of the one or more second WUS monitoring parameters are different WUS monitoring parameters. In a second aspect, alone or in combination with the first aspect, the at least the subset of the one or more first WUS monitoring parameters and the at least the subset of the one or more second WUS monitoring parameters include at least one of different WUS bandwidth parts, different WUS control resource sets, different WUS search space sets, different WUS downlink control information configurations, or different offset durations between a WUS occasion and a DRX on duration.

In a third aspect, alone or in combination with one or more of the first and second aspects, the one or more first WUS monitoring parameters indicate that the UE is to monitor for a UE-specific WUS, and the one or more second WUS monitoring parameters indicate that the UE is to monitor for a group-specific WUS. In a fourth aspect, alone or in combination with one or more of the first through third aspects, the one or more first WUS monitoring parameters identify a first WUS BWP, and the first WUS BWP includes at least one of fewer time-domain resources or frequency-domain resources relative to the second WUS BWP.

In a fifth aspect, alone or in combination with one or more of the first through fourth aspects, the one or more first WUS monitoring parameters indicate that the UE is to refrain from monitoring for the WUS during short DRX cycle operation of the UE, or the one or more second WUS monitoring parameters indicate that the UE is to refrain from monitoring for the WUS during long DRX cycle operation of the UE. In a sixth aspect, alone or in combination with one or more of the first through fifth aspects, the WUS monitoring configuration indicates that the UE is to monitor for the WUS if a DRX associated with the WUS satisfies a duration threshold.

In a seventh aspect, alone or in combination with one or more of the first through sixth aspects, the WUS monitoring configuration is included in at least one of a radio resource control communication, a medium access control control element communication, a downlink control information communication, a system information block, other system information, or remaining minimum system information. In an eighth aspect, alone or in combination with one or more of the first though seventh aspects, process 600 includes determining that a long DRX cycle of the UE and a short DRX cycle of the UE at least partially overlap in the time domain, and determining whether to operate in the long DRX cycle or the short DRX cycle based at least in part on respective priorities associated with each of the long DRX cycle and the short DRX cycle.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
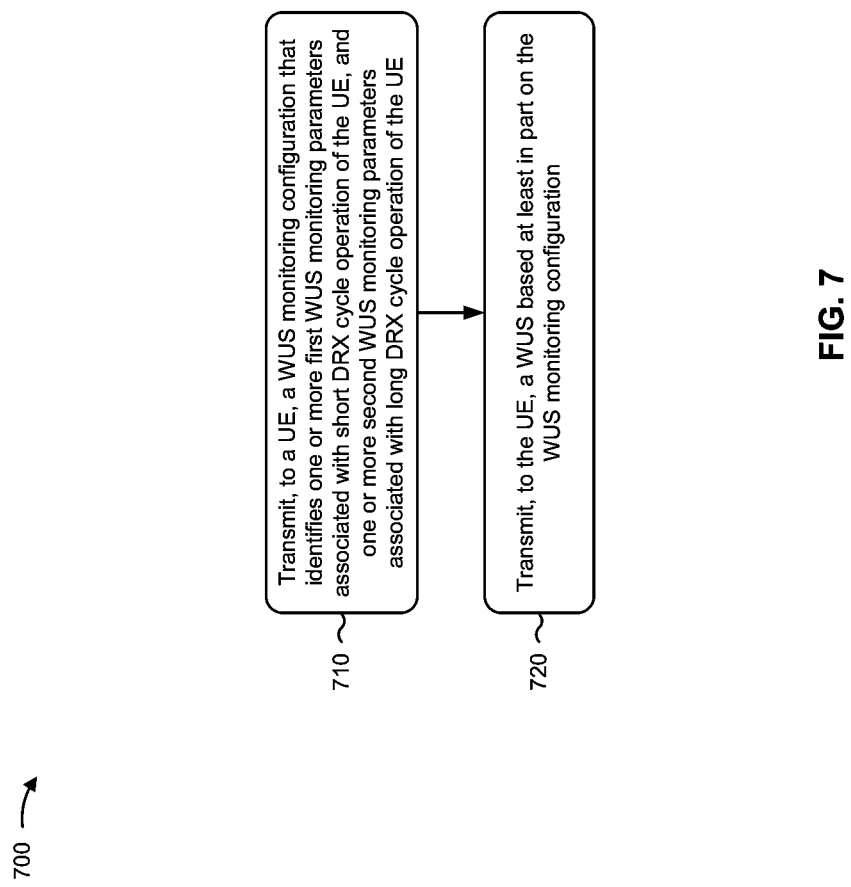
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where the BS (e.g., BS 110) performs operations associated with configurable WUS monitoring for short and long DRX cycle operation.

As shown in FIG. 7, in some aspects, process 700 may include transmitting, to a UE, a WUS monitoring configuration that identifies one or more first WUS monitoring parameters associated with short DRX cycle operation of the UE and one or more second WUS monitoring parameters associated with long DRX cycle operation of the UE (block 710). For example, the BS (e.g., using transmit processor 220, receive processor 238, controller/processor 240, memory 242, and/or the like) may transmit, to a UE, a WUS monitoring configuration that identifies one or more first WUS monitoring parameters associated with short DRX cycle operation of the UE and one or more second WUS monitoring parameters associated with long DRX cycle operation of the UE, as described above.

As further shown in FIG. 7, in some aspects, process 700 may include transmitting, to the UE, a WUS based at least in part on the WUS monitoring configuration (block 720). For example, the BS (e.g., using transmit processor 220, receive processor 238, controller/processor 240, memory 242, and/or the like) may transmit, to the UE, a WUS based at least in part on the WUS monitoring configuration, as described above. In some aspects, the BS may identify whether the UE is in short DRX cycle operation or long DRX cycle operation. In some aspects, the BS may transmit the WUS based at least in part on the one or more first WUS monitoring parameters identified in the WUS monitoring configuration based at least in part on determining that the UE is in short DRX cycle operation. In some aspects, the BS may transmit the WUS based at least in part on the one or more second WUS monitoring parameters identified in the WUS monitoring configuration based at least in part on determining that the UE is in long DRX cycle operation.

Process 700 may include additional aspects, such as any single aspect or any combination of aspects described below and/or in connection with one or more other processes described elsewhere herein.

In a first aspect, at least a subset of the one or more first WUS monitoring parameters and at least a subset of the one or more second WUS monitoring parameters are different WUS monitoring parameters. In a second aspect, alone or in combination with the first aspect, the at least the subset of the one or more first WUS monitoring parameters and the at least the subset of the one or more second WUS monitoring parameters include at least one of different WUS bandwidth parts, different WUS control resource sets, different WUS search space sets, different WUS downlink control information configurations, or different offset durations between a WUS occasion and a DRX on duration.

In a third aspect, alone or in combination with one or more of the first and second aspects, the one or more first WUS monitoring parameters indicate that the UE is to monitor for a UE-specific WUS, and the one or more second WUS monitoring parameters indicate that the UE is to monitor for a group-specific WUS. In a fourth aspect, alone or in combination with one or more of the first through third aspects, the one or more first WUS monitoring parameters identify a first WUS BWP, and the first WUS BWP includes at least one of fewer time-domain resources or frequency-domain resources relative to the second WUS BWP.

In a fifth aspect, alone or in combination with one or more of the first through fourth aspects, the one or more first WUS monitoring parameters indicate that the UE is to refrain from monitoring for the WUS during short DRX cycle operation of the UE, or the one or more second WUS monitoring parameters indicate that the UE is to refrain from monitoring for the WUS during long DRX cycle operation of the UE. In a sixth aspect, alone or in combination with one or more of the first through fifth aspects, the WUS monitoring configuration indicates that the UE is to monitor for the WUS if a DRX associated with the WUS satisfies a duration threshold.

In a seventh aspect, alone or in combination with one or more of the first through sixth aspects, the WUS monitoring configuration is included in at least one of a radio resource control communication, a medium access control control element communication, a downlink control information communication, a system information block, other system information, or remaining minimum system information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a wakeup signal (WUS) monitoring configuration that identifies:
      one or more first WUS monitoring parameters associated with short discontinuous reception (DRX) cycle operation of the UE, wherein the one or more first WUS monitoring parameters identify a first downlink control information (DCI) configuration that indicates a first type of mapping for a WUS during the short DRX cycle operation of the UE, and
      one or more second WUS monitoring parameters associated with long DRX cycle operation of the UE, wherein the one or more second WUS monitoring parameters identify a second DCI configuration that indicates a second type of mapping for the WUS during the long DRX cycle operation of the UE, wherein the second type of mapping is different from the first type of mapping, wherein one of the first type of mapping or the second type of mapping is a static mapping, and wherein another one of the first type of mapping or the second type of mapping is a dynamic mapping; and
   monitoring for the WUS based at least in part on the WUS monitoring configuration.

2. The method of claim 1, wherein at least a subset of the one or more first WUS monitoring parameters and at least a subset of the one or more second WUS monitoring parameters are different WUS monitoring parameters.

3. The method of claim 2, wherein the at least the subset of the one or more first WUS monitoring parameters and the at least the subset of the one or more second WUS monitoring parameters include at least one of:
   different WUS bandwidth parts,
   different WUS control resource sets,
   different WUS search space sets, or
   different WUS downlink control information configurations that include the first DCI configuration and the second DCI configuration.

4. The method of claim 1, wherein the one or more first WUS monitoring parameters indicate that the UE is to monitor for a UE-specific WUS; and
   wherein the one or more second WUS monitoring parameters indicate that the UE is to monitor for a group-specific WUS.

5. The method of claim 1, wherein the one or more first WUS monitoring parameters further identify a first WUS bandwidth part (BWP);
   wherein the one or more second WUS monitoring parameters further identify a second WUS BWP; and
   wherein the first WUS BWP includes at least one of fewer time-domain resources or frequency-domain resources relative to the second WUS BWP.

6. The method of claim 1, wherein the one or more first WUS monitoring parameters indicate that the UE is to refrain from monitoring for the WUS during short DRX cycle operation of the UE, or
   wherein the one or more second WUS monitoring parameters indicate that the UE is to refrain from monitoring for the WUS during long DRX cycle operation of the UE.

7. The method of claim 1, wherein the WUS monitoring configuration indicates that the UE is to monitor for the WUS if a DRX associated with the WUS satisfies a duration threshold.

8. The method of claim 1, wherein the WUS monitoring configuration is included in at least one of:
   a radio resource control communication,
   a medium access control control element communication,
   a downlink control information communication,
   a system information block,
   other system information, or
   remaining minimum system information.

9. The method of claim 1, further comprising:
   determining that a long DRX cycle of the UE and a short DRX cycle of the UE at least partially overlap in a time domain; and
   determining whether to operate in the long DRX cycle or the short DRX cycle based at least in part on respective priorities associated with each of the long DRX cycle and the short DRX cycle.

10. A method of wireless communication performed by a base station (BS), comprising:
    transmitting, to a user equipment (UE), a wakeup signal (WUS) monitoring configuration that identifies:
       one or more first WUS monitoring parameters associated with short discontinuous reception (DRX) cycle operation of the UE, wherein the one or more first WUS monitoring parameters identify a first downlink control information (DCI) configuration that indicates a first type of mapping for a WUS during the short DRX cycle operation of the UE, and
       one or more second WUS monitoring parameters associated with long DRX cycle operation of the UE, wherein the one or more second WUS monitoring parameters identify a second DCI configuration that indicates a second type of mapping for the WUS during the long DRX cycle operation of the UE, wherein the second type of mapping is different from the first type of mapping, wherein one of the first type of mapping or the second type of mapping is a static mapping, and wherein another one of the first type of mapping or the second type of mapping is a dynamic mapping; and
    transmitting, to the UE, the WUS based at least in part on the WUS monitoring configuration.

11. The method of claim 10, wherein at least a subset of the one or more first WUS monitoring parameters and at least a subset of the one or more second WUS monitoring parameters are different WUS monitoring parameters.

12. The method of claim 11, wherein the at least the subset of the one or more first WUS monitoring parameters and the at least the subset of the one or more second WUS monitoring parameters include at least one of:
 different WUS bandwidth parts,
 different WUS control resource sets,
 different WUS search space sets, or
 different WUS downlink control information configurations that include the first DCI configuration and the second DCI configuration.

13. The method of claim 10, wherein the one or more first WUS monitoring parameters indicate that the UE is to monitor for a UE-specific WUS; and
 wherein the one or more second WUS monitoring parameters indicate that the UE is to monitor for a group-specific WUS.

14. The method of claim 10, wherein the one or more first WUS monitoring parameters further identify a first WUS bandwidth part (BWP);
 wherein the one or more second WUS monitoring parameters further identify a second WUS BWP; and
 wherein the first WUS BWP includes at least one of fewer time-domain resources or frequency-domain resources relative to the second WUS BWP.

15. The method of claim 10, wherein the one or more first WUS monitoring parameters indicate that the UE is to refrain from monitoring for the WUS during short DRX cycle operation of the UE, or
 wherein the one or more second WUS monitoring parameters indicate that the UE is to refrain from monitoring for the WUS during long DRX cycle operation of the UE.

16. The method of claim 10, wherein the WUS monitoring configuration indicates that the UE is to monitor for the WUS if a DRX associated with the WUS satisfies a duration threshold.

17. The method of claim 10, wherein the WUS monitoring configuration is included in at least one of:
 a radio resource control communication,
 a medium access control control element communication,
 a downlink control information communication,
 a system information block,
 other system information, or
 remaining minimum system information.

18. A user equipment (UE) for wireless communication, comprising:
 one or more memories; and
 one or more processors, coupled to the one or more memories, configured to:
  receive a wakeup signal (WUS) monitoring configuration that identifies:
   one or more first WUS monitoring parameters associated with short discontinuous reception (DRX) cycle operation of the UE, wherein the one or more first WUS monitoring parameters identify a first downlink control information (DCI) configuration that indicates a first type of mapping for a WUS during the short DRX cycle operation of the UE, and
   one or more second WUS monitoring parameters associated with long DRX cycle operation of the UE, wherein the one or more second WUS monitoring parameters identify a second DCI configuration that indicates a second type of mapping for the WUS during the long DRX cycle operation of the UE, wherein the second type of mapping is different from the first type of mapping, wherein one of the first type of mapping or the second type of mapping is a static mapping, and wherein another one of the first type of mapping or the second type of mapping is a dynamic mapping; and
  monitor for the WUS based at least in part on the WUS monitoring configuration.

19. The UE of claim 18, wherein at least a subset of the one or more first WUS monitoring parameters and at least a subset of the one or more second WUS monitoring parameters are different WUS monitoring parameters.

20. The UE of claim 19, wherein the at least the subset of the one or more first WUS monitoring parameters and the at least the subset of the one or more second WUS monitoring parameters include at least one of:
 different WUS bandwidth parts,
 different WUS control resource sets,
 different WUS search space sets, or
 different WUS downlink control information configurations that include the first DCI configuration and the second DCI configuration.

21. The UE of claim 18, wherein the one or more first WUS monitoring parameters indicate that the UE is to monitor for a UE-specific WUS; and
 wherein the one or more second WUS monitoring parameters indicate that the UE is to monitor for a group-specific WUS.

22. The UE of claim 18, wherein the one or more first WUS monitoring parameters further identify a first WUS bandwidth part (BWP);
 wherein the one or more second WUS monitoring parameters further identify a second WUS BWP; and
 wherein the first WUS BWP includes at least one of fewer time-domain resources or frequency-domain resources relative to the second WUS BWP.

23. The UE of claim 18, wherein the one or more first WUS monitoring parameters indicate that the UE is to refrain from monitoring for the WUS during short DRX cycle operation of the UE, or
 wherein the one or more second WUS monitoring parameters indicate that the UE is to refrain from monitoring for the WUS during long DRX cycle operation of the UE.

24. The UE of claim 18, wherein the one or more first WUS monitoring parameters identify a first WUS type that is different from a second WUS type that is identified by the one or more second WUS monitoring parameters.

25. The UE of claim 18, wherein the one or more first WUS monitoring parameters further identify a first WUS offset duration, and
 wherein the first WUS offset duration is an offset duration between a WUS occasion and a DRX on duration.

26. The UE of claim 18, wherein the first type of mapping is the static mapping, and
 wherein the second type of mapping is the dynamic mapping.

27. The UE of claim 18, wherein the first type of mapping is the dynamic mapping.

28. The UE of claim 18, wherein, when the WUS is configured with the static mapping, the WUS includes indicator fields for the UE and one or more other UEs interleaved with wakeup information fields for the UE and the one or more other UEs.

29. The UE of claim 18, wherein the WUS includes:
 a first WUS indicator field for the UE,
 a first wakeup information field for the UE, a second WUS indicator field, for another UE, adjacent to the first wakeup information field for the UE, and a second wakeup information field for the other UE.

30. The UE of claim 18, wherein, when the WUS is configured with the static mapping, the WUS includes:

WUS indicator fields for the UE and one or more other UEs grouped together, and wakeup information fields for the UE and the one or more other UEs grouped separately from the WUS indicator fields.

31. A base station (BS) for wireless communication, comprising:

one or more memories; and one or more processors, coupled to the one or more memories, configured to:

transmit, to a user equipment (UE), a wakeup signal (WUS) monitoring configuration that identifies:

one or more first WUS monitoring parameters associated with short discontinuous reception (DRX) cycle operation of the UE, wherein the one or more first WUS monitoring parameters identify a first downlink control information (DCI) configuration that indicates a first type of mapping for a WUS during the short DRX cycle operation of the UE, and one or more second WUS monitoring parameters associated with long DRX cycle operation of the UE, wherein the one or more second WUS monitoring parameters identify a second DCI configuration that indicates a second type of mapping for the WUS during the long DRX cycle operation of the UE, wherein the second type of mapping is different from the first type of mapping, wherein one of the first type of mapping or the second type of mapping is a static mapping, and wherein another one of the first type of mapping or the second type of mapping is a dynamic mapping; and transmit, to the UE, the WUS based at least in part on the WUS monitoring configuration.

32. The BS of claim 31, wherein at least a subset of the one or more first WUS monitoring parameters and at least a subset of the one or more second WUS monitoring parameters are different WUS monitoring parameters.

33. The BS of claim 32, wherein the at least the subset of the one or more first WUS monitoring parameters and the at least the subset of the one or more second WUS monitoring parameters include at least one of:

different WUS bandwidth parts, different WUS control resource sets, different WUS search space sets, or different WUS downlink control information configurations that include the first DCI configuration and the second DCI configuration.

34. The BS of claim 31, wherein the one or more first WUS monitoring parameters indicate that the UE is to monitor for a UE-specific WUS; and wherein the one or more second WUS monitoring parameters indicate that the UE is to monitor for a group-specific WUS.

35. The BS of claim 31, wherein the one or more first WUS monitoring parameters further identify a first WUS bandwidth part (BWP);

wherein the one or more second WUS monitoring parameters further identify a second WUS BWP; and wherein the first WUS BWP includes at least one of fewer time-domain resources or frequency-domain resources relative to the second WUS BWP.

36. The BS of claim 31, wherein the one or more first WUS monitoring parameters indicate that the UE is to refrain from monitoring for the WUS during short DRX cycle operation of the UE, or wherein the one or more second WUS monitoring parameters indicate that the UE is to refrain from monitoring for the WUS during long DRX cycle operation of the UE.

37. The BS of claim 31, wherein the WUS monitoring configuration indicates that the UE is to monitor for the WUS if a DRX associated with the WUS satisfies a duration threshold.

* * * * *